(12) United States Patent
Govindarajan et al.

(10) Patent No.: US 9,185,222 B1
(45) Date of Patent: Nov. 10, 2015

(54) IDENTIFYING ESCALATION EVENTS IN COMMUNICATION SESSIONS

(71) Applicant: Avaya Inc., Basking Ridge, NJ (US)

(72) Inventors: Jayesh Govindarajan, Palo Alto, CA (US); Satyen Hingorani, Brentwood, TN (US); Vyankatesh Deshpande, Maharashtra (IN); Ravishankar Palaparthi, San Jose, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/266,728

(22) Filed: Apr. 30, 2014

(51) Int. Cl.
   *H04M 3/00* (2006.01)
   *H04M 5/00* (2006.01)
   *H04M 3/523* (2006.01)

(52) U.S. Cl.
   CPC .................................. *H04M 3/523* (2013.01)

(58) Field of Classification Search
   USPC ........................................ 379/265.06, 265.09
   See application file for complete search history.

(56) References Cited

U.S. PATENT DOCUMENTS

| 5,862,223 | A  | * | 1/1999  | Walker et al. ................... 705/50 |
| 2005/0286705 | A1 | * | 12/2005 | Contolini et al. ........ 379/265.02 |

* cited by examiner

Primary Examiner — Quynh Nguyen

(57) ABSTRACT

Embodiments provide communication session analysis and intervention methods and systems. Exemplary methods include monitoring a communication session conducted by a first customer service agent, providing script items to the first customer service agent, receiving session information associated with the communication session, identifying an escalation event in the session information, during the communication session, using on one or more predetermined communication criteria, and inviting a second customer service agent to join the communication session, in response to the escalation event.

20 Claims, 5 Drawing Sheets

IDENTIFYING ESCALATION EVENTS IN COMMUNICATION SESSIONS

BACKGROUND

Customer service agents often participate in outbound and inbound communication sessions, such as telephone calls, with individuals for a variety of reasons such as technical support, customer retention, and so forth. Customer service agents sometimes follow a call script when engaging with customers.

In some instances, the communication session may require the assistance of another customer service agent (e.g., a coach, supervisor, manager, or higher ranked agent) to assist the initial customer service agent in the call.

For example, based on the interactions between the customer service agent and the customer, the customer service agent may decide that they need the assistance of another customer service agent such as a manager or supervisor. In such cases if the other customer service agent does not join the call or does not join in a timely manner then the customer may become frustrated or dissatisfied.

SUMMARY

According to some embodiments, the present technology may be directed to methods that comprise: (a) monitoring a communication session conducted by a first customer service agent; (b) providing script items to the first customer service agent; (c) receiving session information associated with the communication session; (d) identifying an escalation event based on the session information, during the communication session, using on one or more predetermined communication criteria; and (e) inviting a second customer service agent to join the communication session, in response to the escalation event.

According to various embodiments, the present technology may be directed to method that comprises: (a) monitoring a communication session conducted by a first customer service agent; (b) receiving session information associated with the communication session; (c) identifying an escalation event based on the session information, during the communication session, using on one or more predetermined communication criteria; and (d) inviting a second customer service agent to join the communication session.

According to other embodiments, the present technology may be directed to a system that comprises: (a) a processor; and (b) a memory for storing executable instructions, the processor executing the instructions to: (i) monitor a communication session conducted by a first customer service agent; (ii) receive session information associated with the communication session; (iii) identify one or more escalation events during the communication session based on one or more predetermined communication criteria; and (iv) invite a second customer service agent to join the communication session.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
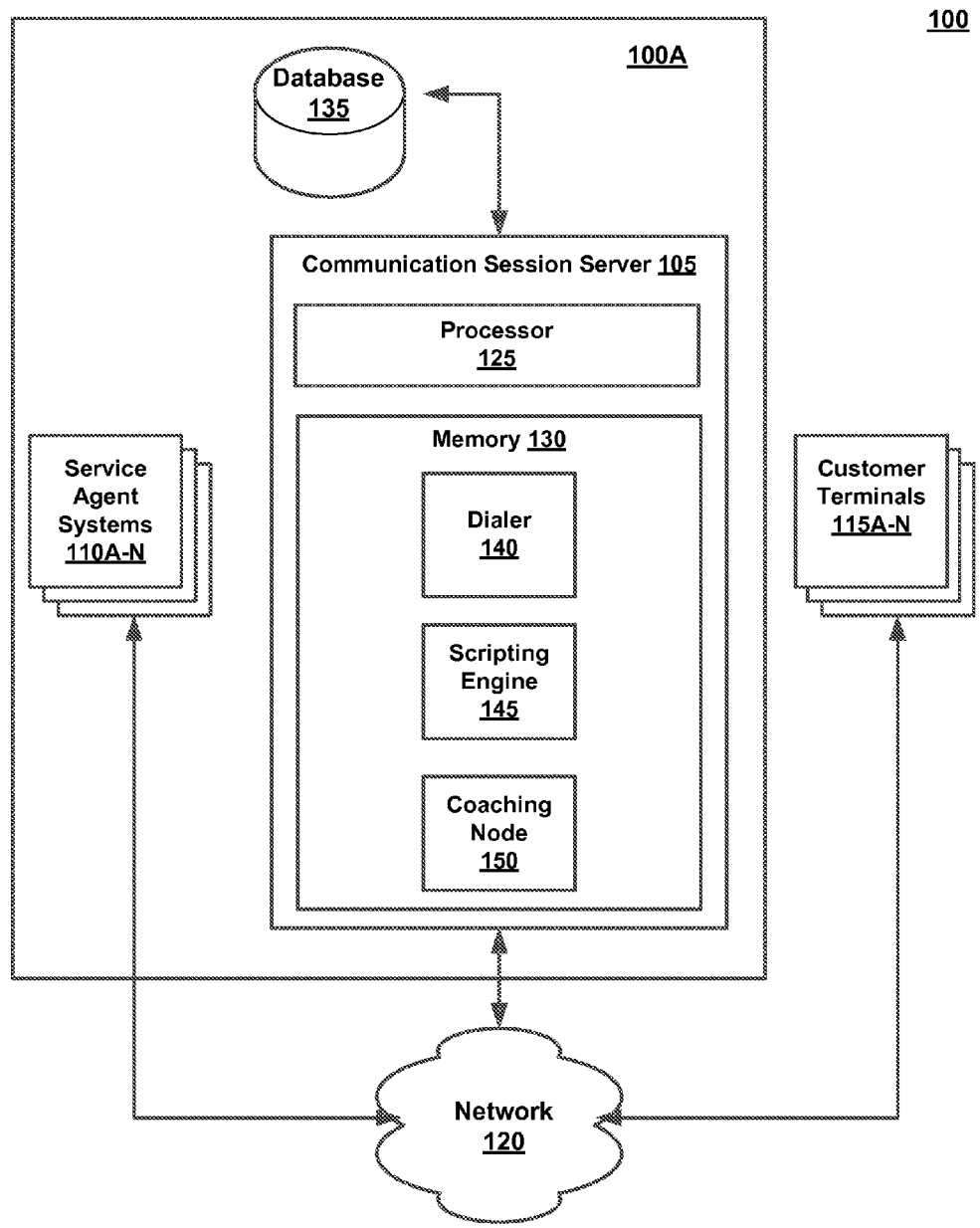
FIG. 1 is a schematic diagram of an example network architecture that includes a communication session server that is configured to create communication sessions between customer service agents using service agent and customers using customer terminals.

FIG. 1 is a schematic diagram of an example network architecture 100 that includes a communication session server 105 that is configured to create communication sessions between customer service agents using service agent systems 110A-N and customers using customer terminals 115A-N. In general, a service agent system may include a computing system that is configured to participate in a communication sessions with customers. For example, a service agent system may provide audio and/or video communications that allow a customer service agent to communicate with customers. The service agent system may also allow the customer service agent to retrieve and view call scripts, customer records, and other similar items.

A customer terminal may include an end user computing system, a Smartphone, a telephone, tablet, PDA, mobile internet device, or other similar device or system that allows a customer to participate in voice or multimedia communication sessions with other parties, such as service agent systems.

The communication session server 105 is configured to facilitate communication sessions between at least one service agent system and at least one customer terminal. A communication session may include a voice session, such as a telephone call. In other implementations, a communication session may include a voice over Internet protocol (VoIP) session, a multimedia session where video and audio services are both used. An example of a communication session server may include a session initiation protocol (SIP) server. Other types of communication sessions may include chat sessions, instant messaging, SMS (short message service) or MMS (multimedia message service), or any other communication session (or combination of services).

In some embodiments, the communication session server 105 may be integrated or included within a call center that facilitates inbound and/or outbound communication sessions between call agents and customers or other individuals. The communication session server 105 may use any of various suitable types of computer telephony integration.

In one embodiment, a call center 100A may include, in part, the communication session server 105, the service agent systems 110A-N, and a database 135.

In some instances the communication session server 105 may be established as a cloud computing system. In an example embodiment, a cloud-based computing environment is a resource that combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers such as communication session server 105 with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The communication session server 105 may communicatively couple with the service agent systems 110A-N and customers using customer terminals 115A-N over any one or combination of a number of public and/or private networks, such as networks 120. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), 3G, 4GLTE and other cellular phone networks, GPS (Global Positioning System), CDPD (cellular digital packet data), RIM (Research in Motion, Limited) duplex paging network, Bluetooth radio, or an IEEE 802.11-based radio frequency network. Network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The communication session server 105 may provide automatic call distribution features where inbound calls initiated by customers can be directed to specific customer service agents based upon the needs of the customer. For example, in an inbound call scenario the communication session server 105 may direct a call for technical support to an agent that specializes in technical support related issues.

During a communication session, the communication session server 105 may provide to a service agent system a call script that is comprised of script items. For example, call script may include script items such as a salutation item, and one or more question or inquiry related items, a closing or ending script item, etc. These questions, inquiries, prompts, and other suggestions are designed to promote a positive and efficient dialogue between the agent and the customer. In some embodiments, the details of the call script may depend upon the nature of the problem to be resolved or the information that the agent needs to communicate to the customer. Thus, the script items for any given script will also depend upon these requirements. In some instances the script items may include predetermined responses for common customer communications such as complaints, requests, questions, and so forth.

In accordance with the present disclosure, the communication session server 105 may comprise a processor 125 and a memory 130 that stores logic (e.g., executable instructions) that can be executed by the processor 125 to perform the various methods described in greater detail herein. Additional details regarding the structures of the communication session server 105 are described in greater detail below in reference to FIG. 5.

Each communication session may generate various types of session information. For example, session information may include overall session duration, words spoken by either the agent and the customer, and call script usage. In some instances, a call script may include distinct segments associated with script items. Each script item can be associated with an expected duration that specifies how long it should it should take to complete the script item. For example, a script item may include obtaining identifying information from the customer. This script item may have an expected duration of two minutes, which includes a time required for the agent to request the information and a time required for the customer to respond. This is a non-limiting example of a script item and expected duration. In some embodiments, the expected duration may be determined from a historical review of duration times for similar script item scenarios.

In some embodiments, the communication session server 105 may be programmed with logic that comprises various rules, referred to as predetermined communication criteria. In some embodiments, the predetermined communication criteria may be programmed or stored prior to establishing a communication session. In an example embodiment an escalation event is defined by the communication session server 105 when session information exceeds a predetermined threshold of predetermined communication criteria. In some embodiments the communication session server 105 uses predetermined communication criteria to identify escalation events.

In some embodiments, predetermined communication criteria can be created, stored, and accessed by the communication server 105. In some embodiments predetermined communication criteria can be updated to improve the quality of the predetermined communication criteria.

Predetermined communication criteria may include rules or benchmark values (e.g. thresholds) that can be used as a basis for measuring or evaluating session information. Non-limiting examples of predetermined communication criteria can include expected script item duration, expected script navigation, expected script usage, keywords or phrases that indicate customer dissatisfaction, voice volume values, and any combinations or permutations of these criteria. The exact types of predetermined communication criteria may depend upon the types of session information that can be extracted from a communication session. For example, in some instances only session information such as call script navigation and usage can be determined for a communication session. Thus, the predetermined communication criteria used for comparison may include expected call script navigation and expected call script usage.

In some embodiments, predetermined communication criteria could be established for agents during a particular shift by analyzing data from a scripting engine 145 of the communication session server 105. In an example implementation, during a session related to collections, the communication session server 105 determines that agents are spending on average of one minute on a given script screen. During a similar subject matter session, the communication session server 105 may compare session information for a single agent session and determine the agent has spent five minutes on the same or similar script screen. Based on the script screen time exceeding a preset threshold of one minute (e.g., predetermined communication criteria), the communication session server 105 may automatically invite a coach to join the call without agent request or input.

Session information can include any type of data about a communication session such as duration, scripts items used, navigation of script item, duration per script item, duration of transition between script items, selection of next script items session duration, keywords or phrases, script usage, or any other type of session data that can be measured and evaluated (either quantitatively or qualitatively). This session information can then be compared to threshold or expected values, predetermined communication criteria, in order to identify escalation events.

Session information such as duration can refer to any measurable time period for an event occurring during a communication session, such as length of time it takes for the agent to acknowledge the customer with a salutation, a length of use of a script screen, an overall length of a communication session, and so forth. In another example, the duration may refer to a time that it takes for a customer to furnish necessary information to the agent that allows the agent to retrieve the customer's record. In an example scenario, predetermined communication criteria of a duration may include that the customer should be greeted within at least ten seconds of communication session initiation. If the agent takes twenty seconds to greet the customer, the communication server may indicate that an escalation event has occurred based on comparing the actual session information (twenty seconds) to predetermined communication criteria (at least ten seconds).

Duration may not just be representative of the entry session, but of segments of the session that are defined by a call script (e.g., script items). Thus, in another example, identifying an escalation event may include comparing session information such as a duration of time spent on a script item by any of the plurality of customer service agents to predetermined communication criteria such as an expected duration for the script item. If any of the communications sessions have a duration of time spent on a script item that exceeds the expected duration the communication session server 105 may identify the communication session as having an escalation event.

Session information such as "scripts used" may refer to specific script items used by the customer service agent during a communication session. For example, the customer service agent may use a salutation script screen as well as a plurality of information gathering screens that are used to obtain information from a customer.

In some instances, session information such as navigation of scripts refers to the actual navigation of individual script items such as screens of a call script by an agent. For example, the session information may indicate that the customer service agent has navigated from a salutation script screen to an ordered number of information gathering screens. In an example scenario predetermined communication criteria may specify that agent is required to navigate from script item A, then to script item B, and finally to script item C in that exact order. If agent navigates instead directly from script item A to C then communication server may determine that an escalation event has occurred based on comparing the actual session information to predetermined communication criteria.

In another example, a navigation of scripts may include script items such as a salutation screen followed by a series of information gathering screens, and optionally one or more customer recovery screens that provide the agent with dialogue that is designed to help the agent converse with a frustrated or angry customer. The expected navigation of scripts would not involve the use of any of the one or more customer recovery screens, which would indicate a dissatisfied customer. The use of any of the one or more customer recovery screens would indicate that an escalation event has occurred. In an example scenario, predetermined communication criteria may include that the agent should complete a salutation screen within at least two minutes. If the agent is still using the salutation screen after two minutes, the communication server indicates that an escalation event has occurred based on comparing the actual session information to predetermined communication criteria.

In another example, skipping one or more of the series of information gathering screens by the agent may indicate that the customer is refusing to answer questions. In one example, if an agent skips a script item the communication session server 105 may identify the deviation in call script usage.

In other embodiments, session information may include duration of transition between scripts that refers to the time it takes for the agent to transition between scripts during a communication session. For example, it may take an agent only a few seconds to transition between each of several call scripts. This may indicate that the agent is not using the scripts properly. In an example scenario, predetermined communication criteria may specify that the agent should spend less than 30 seconds to transition from script A to script B. If agent spends more than 30 seconds then communication server may determine that an escalation event has occurred.

Session information such as selection of next scripts session duration refers to the duration of time it takes for the agent to transition between scripts. Further, these scripts may include an ordered list of script screens where one script transitions into a next script until terminating at a final script screen. In this example, the duration refers to a time it takes for an agent to transition between adjacent script screens or through the entire script. In an example scenario, the predetermined communication criteria specifies that the selection of next scripts session duration for an entire script is seven minutes. If the agent takes longer than seven minutes to complete an entire script (which includes script items such as a salutation screen, an information gathering screen, and an order screen), the communication session server 105 may determine that an escalation event has occurred.

In another embodiment, session information may include keywords or phrases that refer to the actual words spoken by either the customer service agent and/or the customer. These words can be determined using one or more speech-to-text engines that convert the spoken words of the parties into text. In an example scenario, predetermined communication criteria may include given keywords or combinations of keywords. For example, the customer may utter words such as "frustrated", "poor service", or "I want to speak to a manager". In an example scenario, the predetermined communication criteria include a corpus of keywords or phrases that can be compared with the words spoken by the customer during a communication session. When the communication session server 105 determines that a keyword or phrase in the corpus has been uttered by the customer, the communication session server 105 may determine that an escalation event has occurred.

It will be understood that the server 105 may maintain a large corpus of keywords and phrases that are indicative of customer dissatisfaction. As new keywords and phrases are encountered and identified as expressions of customer dissatisfaction, the server 105 may add the new keywords and phrases to the corpus.

Expected script item duration considers how long it should take for a customer service agent to complete a specific script item. For example, it may be determined that the average customer service agent uses a certain call script screen for no longer than five minutes in a successful communication session (e.g., a communication session where the customer is pleased with the customer service provided by the agent). The predetermined communication criteria would include a script item duration that is set at five minutes. If an agent uses a call script screen for greater than five minutes the communication session server 105 may determine that an escalation event has occurred.

Session information may include voice characteristics such as voice volume values, voice quality, voice strength, voice breaking, (or other voice characteristics) of either the customer or the agent during a communication session. The predetermined communication criteria for voice characteristics may specify a threshold and if a given set of voice characteristics exceed this threshold then it is determined that an escalation event has occurred. For example, the communication session server 105 may determine voice volume and may specify a decibel value or range of decibel values. If the communication session server 105 determines that a volume of a customer's (or agent's) voice exceeds this decibel value (or falls within a range of values), it may be inferred that the customer is dissatisfied. Thus, the communication session server 105 may determine that an escalation event has occurred. As mentioned above, the communication session server 105 will gather session information for a communication session. During the communication session the communication session server 105 will evaluate the session information using one or more predetermined communication criteria to identify escalation events in the communication session. In some embodiments, the communication session server 105 can apply the predetermined communication criteria to the session information to identify escalation events.

In some instances, the communication session server 105 is configured to store session records in a database 135. These session records may include session information for communication sessions between agents and customers. As this corpus of records grows the communication session server 105 may refine or adjust the predetermined communication criteria that are used to identify escalation events. Example aspects of session records that can be analyzed are keywords/phrases, duration of script item completion, cadence, voice volume, inflection, and other session information that may be indicative of an escalation event.

In some embodiments, the communication session server 105 may establish one or more communication sessions between service agent systems 110A-N and customers using customer terminals 115A-N using a dialer 140. The communication session server 105 may establish a plurality of communications sessions at the same time. For example, each of the plurality of communications sessions may include at least one customer service agent and at least one customer.

The communication session server 105 monitors active communication sessions and collects session information for each of these active communication sessions. The communication session server 105 analyzes the session information in view of and in comparison to the predetermined communication criteria established for the communication session.

As mentioned above, a set of predetermined communication criteria may be identified for a communication session based upon the call script that has been assigned to the agent for that particular communication session. In other instances, predetermined communication criteria for a communication session can be applied that are independent of the call script. As mentioned above, some predetermined communication criteria may specify that if certain words are spoken during the communication session, the session is identified as having an escalation event.

It will be understood that the communication session server 105 may include or utilize natural language processing technologies to analyze the speech of the agent and/or the customer.

In some embodiments, the communication session server 105 may weight certain types of escalation events higher than others. For example, in an embodiment an escalation event such as when a customer service agent spends too much time on a salutation script item may be weighted as less important than an escalation event such as when a customer demands to speak with a supervisor.

In various embodiments, the types of predetermined communication criteria that may be used for a communication session may be assigned a weight by the communication session server 105. For example, the predetermined communication criteria of keywords and phrases of customer dissatisfaction may be weighted higher than the predetermined communication criteria of expected salutation script duration. The weighting of predetermined communication criteria is used in a calculation of an escalation score, which will be described in greater detail below.

In some embodiments communication session server 105 may create an escalation score associated with predetermined communication criteria. If escalation score exceeds a threshold escalation score then communication session server 105 may identify that an escalation event has occurred.

When the communication session server 105 determines that an escalation event has occurred (or that a communication session has an escalation score that exceeds a threshold escalation score), the communication session server 105 may automatically invite a coach on an agent call without any request by the agent.

In some embodiments, the communication session server 105 may execute a coaching node 150 to invite a second customer service agent, the second customer service agent may also be referred to as supervisor, manager, boss, senior, and so forth (the second customer service agent will be referred to as "supervisor" herein) into the communication session between the original or first customer service agent (e.g., the agent selected by the dialer 140) and the customer. The coaching node 150 may select the appropriate supervisor from a list of supervisors. That is, each customer service agent may be associated with one or more supervisors. The coaching node 150 may determine if any of the supervisors in the list are available and may transmit an invitation to one of the available supervisors. It will be understood that each of the supervisors may use a service agent system. The invitation may include, for example, an email, an SMS message, an MMS message, and/or an alert form that is displayed on the service agent system. The coaching node 150 may also generate a summary of the escalation event that identifies a problem or issue and may include other information such as the first customer service agent's name or the customer's name.

The coaching node 150 may join the supervisor into the communication session automatically or may prompt the supervisor with a choice to join the session. In some implementations, the coaching node 150 will not provide the supervisor a choice, instead the system will automatically insert the supervisor into the communication session without prompting the supervisor. For example, the communication session server 105 may display to the customer service agent that a supervisor is about to be invited into the communication session. The agent's screen may indicate the supervisor's name and any prompts that may need to be read by the agent to the customer to inform them that a supervisor is about to join the session. Likewise, in some embodiments the communication session server 105 may provide a message to the supervisor that an escalation event (or a communication having an escalation score of sufficient magnitude) has occurred and that their presence in the communication session is needed. In various embodiments, the communication session server 105 may provide the supervisor with not only a screen that describes the escalation event, but also one or more scripts that aid the supervisor in improving an outcome of the communication session.

Figure 2:
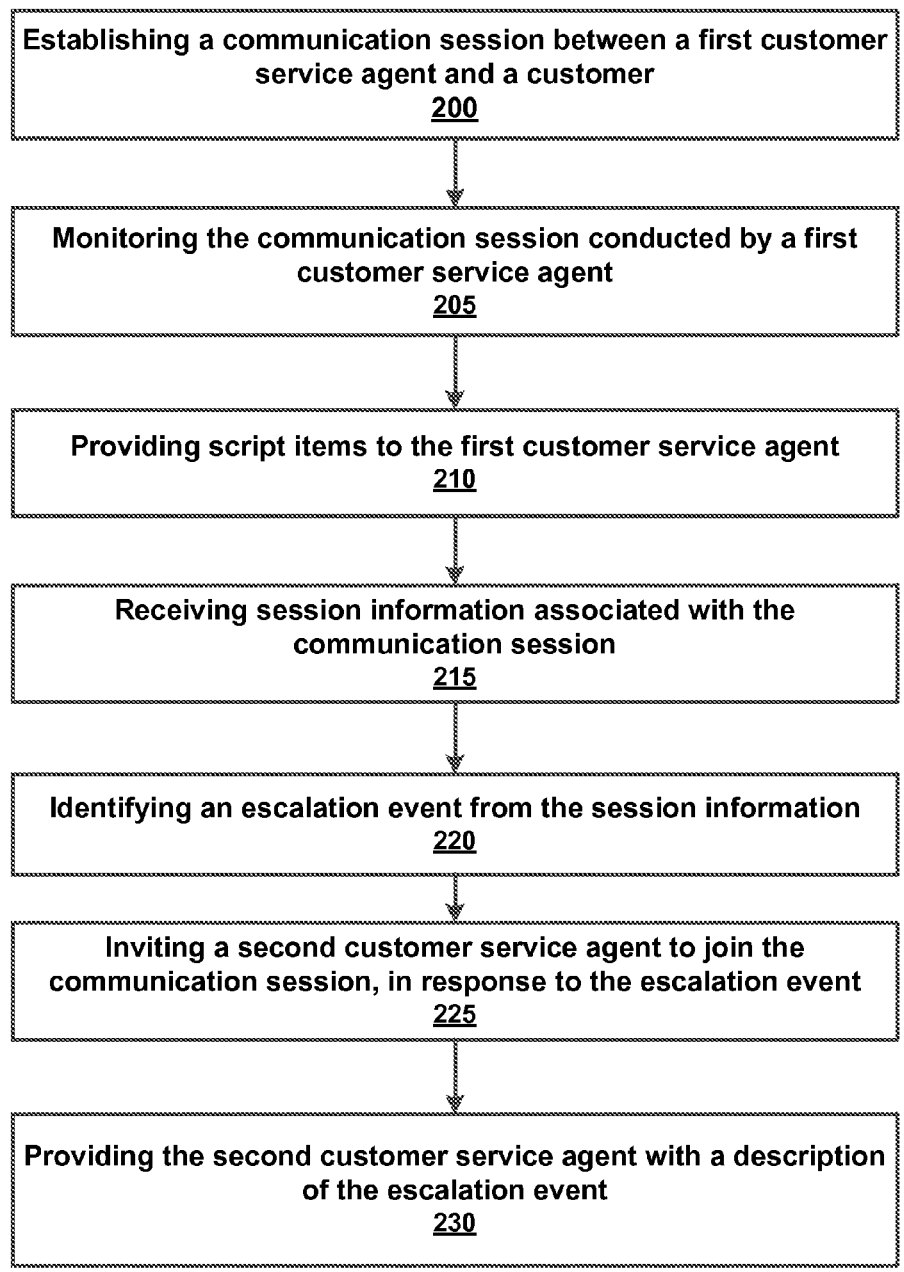
FIG. 2 is a flowchart of an example method for communication session analysis and intervention.

FIG. 2 is a flowchart of an example method for communication session analysis and intervention. The method is executed, for example, by the communication session server 105 described above. The method may include establishing 200 a communication session between a first customer service agent and a customer.

In some embodiments the method includes monitoring 205 a communication session conducted by a first customer service agent. The communication session may include, for example a telephone call, or may include a VoIP session that includes video and voice features. In other examples the communication session may include a chat or instant messaging session.

The first customer service agent can include the agent chosen by the dialer 140 of the communication session server 105, for example. Once the communication session has been established and monitored the method includes providing 210 script items to the first customer service agent. The selection of the script items informs the communication session server 105 as to which predetermined communication criteria to apply to the communication session. As mentioned above, each of the script items (or a subset of the items) is associated with a predetermined communication criterion. This predetermined communication criterion can be applied to session information generated during the communication session to determine the occurrence of escalation events. Again, predetermined communication criteria may also be applied to the communication session that are not dependent upon the script items specifically. For example, total session duration or keywords may not be directly associated with a script item, but may nevertheless be indicative of the occurrence of an escalation event.

The method includes receiving 215 session information associated with the communication session.

The method includes identifying 220 an escalation event from the session information. The identification of escalation events may occur during the communication session, using one or more predetermined communication criteria. In an embodiment, the predetermined communication criteria may be selected based upon the script items selected for the agent. In one example the type (e.g., subject matter) of the communication session may indicate the predetermined communication criteria. For example, a customer recovery call where the agent is attempting to rectify a poor customer experience may have a different set of predetermined communication criteria than a technical support call. The customer recovery call may have lower thresholds for determining escalation events because it is presumed that the customer is displeased and more likely to request a supervisor.

Once an escalation event has been identified, the method comprises automatically adding, inserting, joining or inviting 225 a second customer service agent to the communication session, in response to the escalation event. The second customer service agent can be a coach, a supervisor, a manager, a subject matter expert, or any other individual that is tasked with resolving (or is likely to resolve) the escalation event.

The invitation may include a message such as an email or text message that is provided to the service agent system (one of the service agent systems 110A-N of FIG. 1) that is associated with the second agent. In some instances the invitation may include a request that the second agent join the communication session within a given period of time, such as thirty seconds. In some embodiments, the second agent may be automatically introduced into the communication session by the communication session server 105 without any notice, requests, messages, or prompts. Thus, the first agent, and even the second agent, is not required to make a decision as to if the second agent joins the communication session when the communication session server 105 determines that an escalation event has occurred. The communication session server 105 automatically invites the second agent to the session when the escalation event is detected.

In some instances the communication session server 105 may be configured to invite the second agent only when a predetermined number of escalation events have occurred during a session.

In some embodiments the method optionally includes providing 230 the second customer service agent with a description of the escalation event. This allows the second agent to prepare for the conversation before engaging with the customer and first agent.

Figure 3:
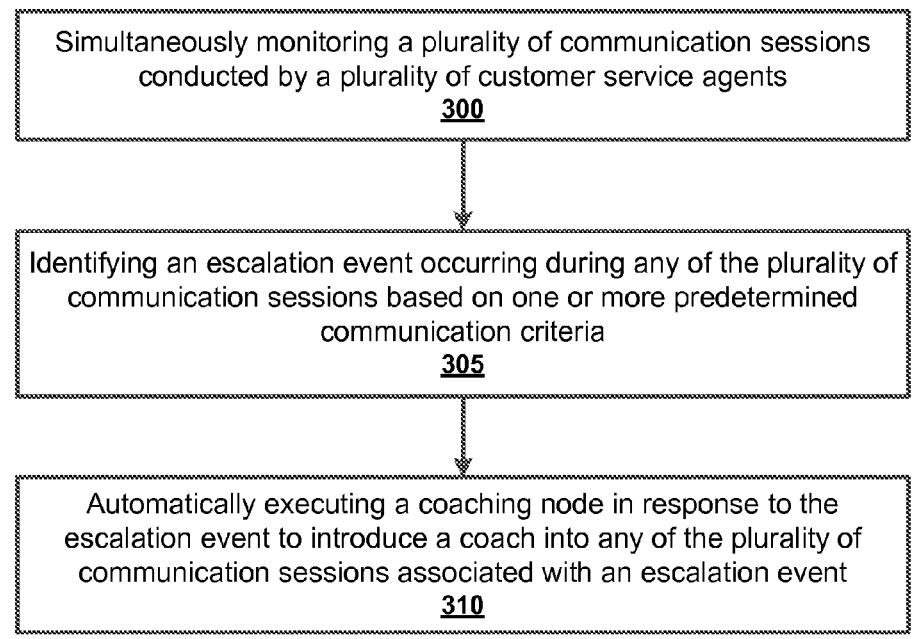
FIG. 3 is a flowchart of another example method for communication session analysis and intervention.

FIG. 3 is a flowchart of another example method of the present technology. This embodiment specifies instances when the communication session server 105 monitors multiple communication sessions simultaneously. The method comprises simultaneously monitoring 300 a plurality of communication sessions conducted by a plurality of customer service agents. These communication sessions were established by the communication session server 105 and may include inbound and/or outbound communication sessions.

Next, the method comprises identifying 305 an escalation event occurring during any of the plurality of communication sessions based on one or more predetermined communication criteria. Thus, each of the sessions are monitored by the communication session server 105 and when any of the communication sessions are determined to have escalation event the method further includes automatically executing 310 a coaching node in response to the escalation event to introduce a coach into any of the plurality of communication sessions associated with an escalation event.

Again, the method of FIG. 3 specifies instances when the communication session server 105 monitors not only multiple communication sessions simultaneously, but specifically the details of each communication session, which may include call session parameters such as duration, type, disposition, and so forth, as well as the monitoring the actual words spoken by each party in the communication session. The communication session server 105 can also monitor script usage. The communication session server 105 is configured to monitor these numerous parameters for a plurality of communication sessions, even when the plurality of sessions occur at the same time, which often occurs in a call center setting. Advantageously, the communication session server 105 can perform call session monitoring processes that would be impossible for a human, namely the simultaneous monitoring of multiple communication sessions. Furthermore, in some embodiments the communication session server 105 advantageously invites managers and supervisors to join communication sessions when an objective and measurable reason exists.

Figure 4:
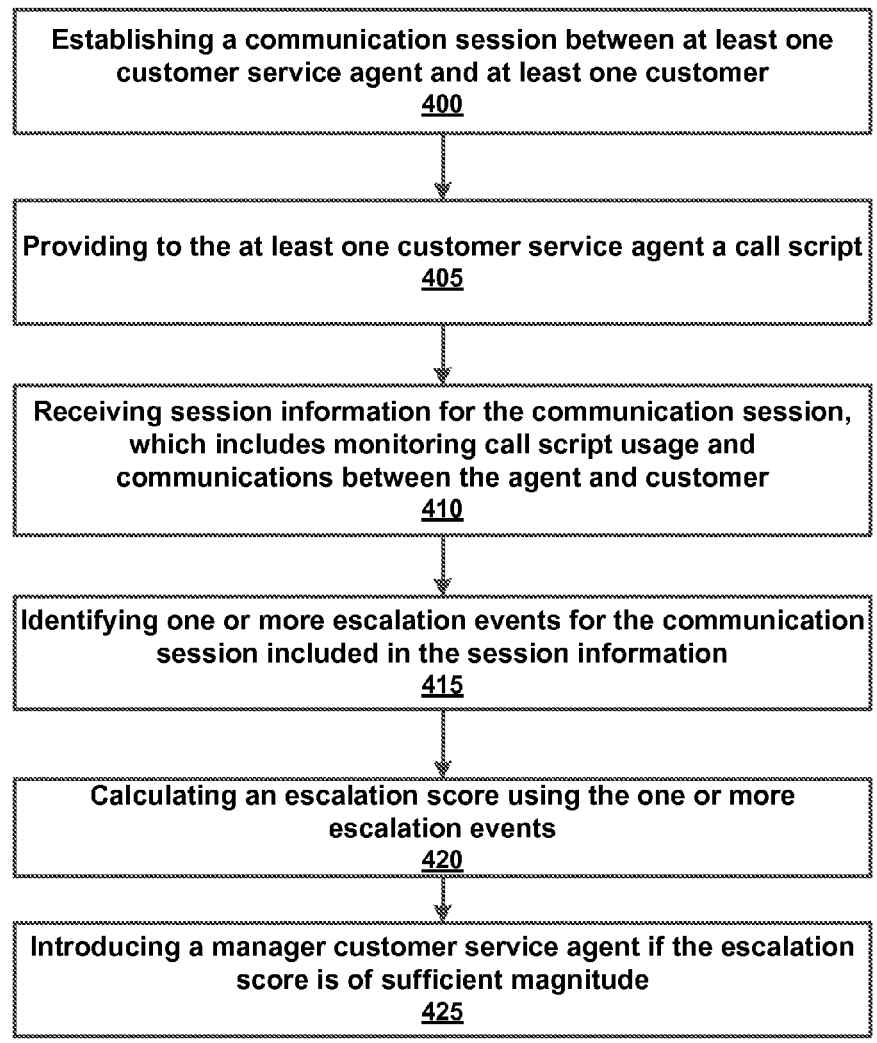
FIG. 4 is a flowchart of another example method for communication session analysis and intervention.

FIG. 4 is yet another flowchart of example method of the present technology. The method may include establishing 400 a communication session between at least one customer service agent and at least one customer. Again, this communication session is facilitated by a communication session server 105. Next, the method includes providing 405 to the at least one customer service agent a call script. The provisioning of the call script also informs the communication session server 105 as to which predetermined communication criteria to apply to the communication session.

Next, the system comprises receiving 410 session information for the communication session, which includes monitoring call script usage and communications between the agent and customer.

The method also includes identifying 415 one or more escalation events for the communication session included in the session information. For example, the communication session server 105 may determine that the agent spent too much time on one or more of the script items included in the call script. Further, the communication session server 105 may determine that the words "dissatisfied" were spoken during the communication session. Again, the comparison to determine if too much time was spent on a script item occurs when the communication session server 105 analyzes the session information to predetermined communication criteria selected for the session.

As mentioned above, the communication session server 105 may score each of these escalation events generally. The communication session server 105 may also assign a weight to each of these escalation event scores. For example, a minor script usage deviation where the agent took seven minutes to obtain contact information from the customer, when the expected duration was five minutes may be scored lower than a larger time deviation. Again, the weighting of an escalation event may be based upon a weighting of the predetermined communication criteria used in the determination of the escalation events. Similarly, the presence of certain words in the communication session such as dissatisfied may be scored higher than other words.

The method includes calculating 420 an escalation score using the one or more escalation events. For example, the communication session server 105 may add together the weighted score of each escalation event.

By way of example, an escalation event for a minor script usage deviation may be assigned a value of 0.3, while an escalation event for a presence of a keyword that is indicative of customer dissatisfaction may be assigned a value of 0.8. The total escalation score would be 1.1. The communication session server 105 may maintain a threshold value for the total escalation score of, for example, 0.9. Since the magnitude of the escalation score is 1.1, the communication session server 105 could automatically introduce or invite a manager or supervisor into the communication session.

In some instances the method includes automatically introducing 425 a manager customer service agent into the communication session if the escalation score is of sufficient magnitude. Thus, the communication session server 105 may maintain a threshold or benchmark value for the communication session. Again, this benchmark value may depend upon an expected type (e.g., subject matter) for the communication session or other factors that may indicate whether the expected tone or behaviors of those participating in the communication session.

Advantageously, in some embodiments the present technology allows for objective introduction/invitation of a manager into a communication session during the communication session, and not in response to information determined after termination of the communication session. In various embodiments, the present technology may reduce the likelihood that a customer service agent will unintentionally fail to escalate a communication session by bringing a manager into the communication session too late, or possibly not at all. The present technology allows a plurality of different types of predetermined communication criteria to be applied to a communication session in real time. In some embodiments, customers will benefit from an improved customer service experience as the present technology will ensure that managers are brought into a communication session as soon as an escalation event (or a communication session with a high escalation score) is detected.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally and interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 5:
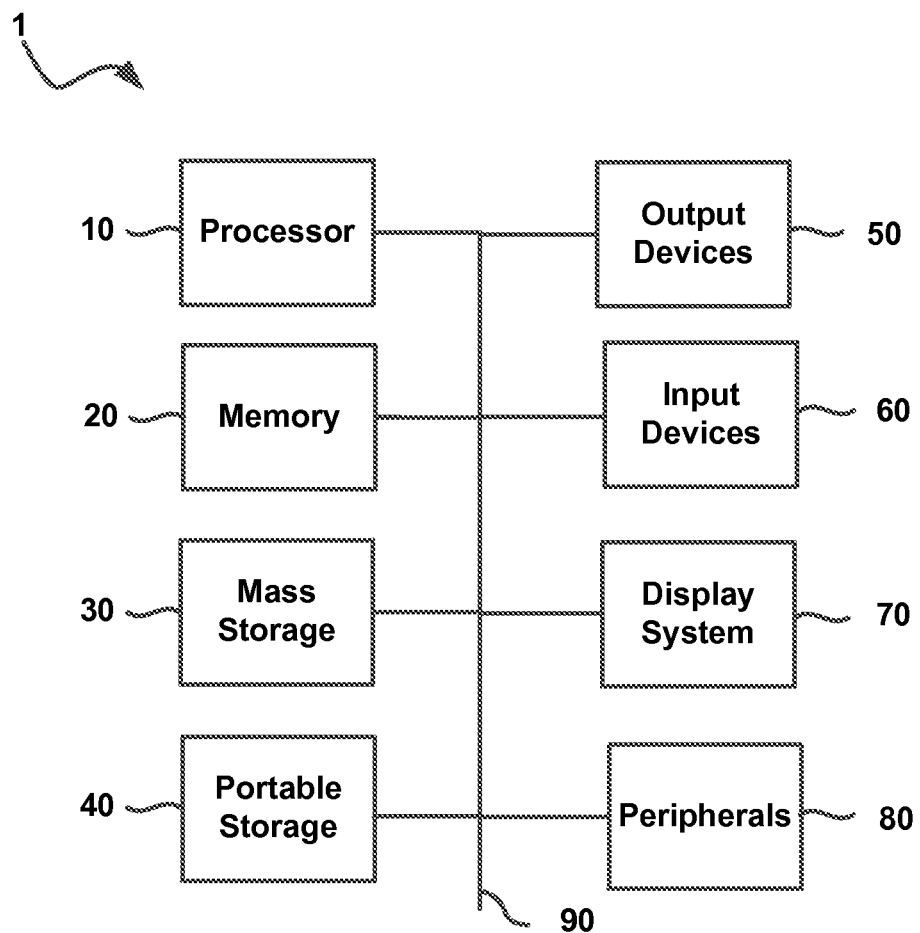
FIG. 5 illustrates an example computing system that may be used to implement embodiments according to the present technology.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale FIG. 5 illustrates an example computing device 1 that may be used to implement an embodiment of the present systems and methods. The computing device 1 of FIG. 5 may be implemented in the contexts of the likes of service agent systems, customer terminals, networks, servers, or combinations thereof. The computing device 1 of FIG. 5 includes a processor 10 and main memory 20. Main memory 20 stores, in part, instructions and data for execution by processor 10. Main memory 20 may store the executable code when in operation. The system 1 of FIG. 5 further includes a mass storage device 30, portable storage device 40, output devices 50, user input devices 60, a display system 70, and peripherals 80.

The components shown in FIG. 5 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 5. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 5 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 5 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Example embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described example embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A computer-implemented method for execution by a hardware processor, comprising:
    monitoring a communication session conducted by a first customer service agent between the first customer service agent and a customer;
    providing script items to the first customer service agent for use by the first customer service agent to communicate with the customer, the script items being based on at least one of a nature of a problem to be resolved or information that the first customer service agent could communicate to the customer;
    receiving session information associated with the communication session;
    identifying an escalation event based on the session information, during the communication session, using one or more predetermined communication criteria; and
    inviting a second customer service agent to join the communication session, in response to the escalation event.

2. A computer-implemented method for execution by a hardware processor, comprising:
    monitoring a communication session conducted by a first customer service agent;
    providing script items to the first customer service agent for use by the first customer service agent to communicate with a customer, the script items being based on at least one of a nature of a problem to be resolved or information that the first customer service agent could communicate to the customer;
    receiving session information associated with the communication session;
    identifying an escalation event based on the session information, during the communication session, using one or more predetermined communication criteria; and
    inviting a second customer service agent to join the communication session.

3. The method of claim 2, wherein receiving session information associated with the communication session includes receiving at least one of an overall session duration, words spoken by the first customer service agent, words spoken by the customer that participants in the communication session, and call script usage.

4. The method of claim 2, wherein the second customer service agent is invited to join the communication session in response to the escalation event.

5. The method of claim 2, wherein the one or more predetermined communication criteria are determined based on analyzing the script items.

6. The method of claim 2, wherein the one or more predetermined communication criteria are determined based on analyzing voice characteristics of the first customer service agent or the customer.

7. The method of claim 2, further comprising determining interactions between the first customer service agent and the customer.

8. The method of claim 2, further comprising determining interactions between the first customer service agent and the customer, wherein the one or more predetermined communication criteria are determined based on analyzing interactions between the first customer service agent and the customer.

9. The method of claim 2, wherein inviting the second customer service agent to join the communication session invitation comprises providing the second customer service agent with a description of the escalation event.

10. The method of claim 2, wherein the predetermined communication criteria comprises an expected duration for any of the script items used by the customer service agent, the communication session, and combinations thereof.

11. The method of claim 2, wherein the predetermined communication criteria comprises any of the script items used by the customer service agent, navigation of the script items by the customer service agent, duration per script item, duration of transition between the script items, and any combinations thereof.

12. The method of claim 2, wherein the predetermined communication criteria comprises an expected duration of script usage that is an average duration for the script used by the customer service agent, determined from historical data of previous communication sessions.

13. The method of claim 2, wherein the predetermined communication criteria comprises expected script navigation.

14. The method of claim 2, further comprising identifying keywords spoken during the communication session using natural language parsing, the keywords being indicative of an escalation event.

15. The method of claim 2, wherein inviting a second customer service agent to join the communication session includes automatically inserting the second customer service agent into the communication session.

16. A system, comprising:
a processor; and
a memory for storing executable instructions, the processor executing the instructions to:
- monitor a communication session conducted by a first customer service agent between the first customer service agent and a customer;
- provide script items to the first customer service agent for use by the first customer service agent to communicate with the customer, the script items being based on at least one of a nature of a problem to be resolved or information that the first customer service agent could communicate to the customer;
- receive session information associated with the communication session;
- identify one or more escalation events during the communication session based on one or more predetermined communication criteria; and
- invite a second customer service agent to join the communication session.

17. The system of claim 16, wherein receiving session information associated with the communication session includes receiving at least one of an overall session duration, words spoken by the first customer service agent, words spoken by the customer that participants in the communication session, and call script usage.

18. The system according to claim 16, wherein the second customer service agent is invited to join the communication session in response to the escalation event.

19. The system of claim 16, wherein the one or more predetermined communication criteria are determined based on analyzing the script items.

20. The system of claim 16, wherein the processor further executes the instructions to:
- calculate an escalation score using the one or more escalation events; and
- wherein the second customer service is automatically introduced into the communication session if the escalation score is of sufficient magnitude.

* * * * *